United States Patent Office 3,535,193
Patented Oct. 20, 1970

3,535,193
OFFSET BLANKET AND PROCESS THEREFOR
Roy W. Prince, Lexington, Mass., assignor to W. R. Grace & Co., New York, N.Y., a corporation of Connecticut
No Drawing. Filed Aug. 20, 1968, Ser. No. 753,853
Int. Cl. B32b 27/26; C08f 1/20
U.S. Cl. 161—88
10 Claims

ABSTRACT OF THE DISCLOSURE

Blankets for planographic printing are made by coating a suitable carcas with a photo-curable liquid composition, doctoring the liquid coating to produce a uniformly thick coating and then exposing the coating to actinic radiation, whereupon a surface suitable for offset printing is produced, and the necessity for repeated coatings and intremediate drying procedures is avoided.

---

One of the most difficult feats in rubber technology has been the successful development of rubber offset blankets. The necessity that the blanket have uniform thickness within very narrow limits, have a uniform durometer hardness of the rubber over the whole extent of the blanket, and at the same time be free from any surface imperfection or subsurface bubble, which would change the layoff of ink onto the printed image, has always required great manufacturing skill.

In the past, the working layer of the offset blankets was laboriously built up by repeatedly coating a carcass layer with a thin film of rubber in solution. Since an exceedingly thin deposit of solid rubber was the result of each coating operation, many coats were required, and before each succeeding coat could be applied to the blanket carcass, all of the suspending fluid had to be removed by drying. This process was slow, for the drying could not be hurried, otherwise vaporization of the solvent takes place at such a rate that bubbles or pits form in the surface. More recently, it has become possible to put thicker coats on offset blanket carcasses and build up the requisite thickness of face rubber somewhat faster than in the past. This has been due to improvement in solvent systems, and to rubbers which do not build up unworkable viscosities at low concentrations. Nevertheless, making an accurate offset blanket in sizes suitable for present-day high-speed offset press work remains an exacting, difficult, and expensive job.

The carcass of offset blankets is usually a multi-ply structure made by rubber-coating or calendering a light-weight, strong textile such as a light-weight canvas with a rubber composition and combining numerous plies of the coated textile under heat and pressure to produce a unitary sheet. The printing face is then built up on this sheet.

I have discovered that it is possible to make an acceptable ink offset surface for offset press blankets by a procedure which requires but a single coating step. If the base or blanket carcass is coated with a photo-curable composition which is either carefully micro-calendered or doctored on to the blanket carcass and then exposed to actinic radiation, the coating is gelled or cured all the way through from the blanket to the carcass, and smooth ink receptive coating highly suited for offset printing is produced in a single pass.

The process has the major advantage that the actinic radiation causes no bubbling or pitting as the liquid coating turns into a gel, and if proper care is taken to see that a uniform flux of actinic radiation reaches all areas of the blanket surface, the whole blanket exhibits a very uniform durometer hardness, and when used on the press lays off ink in a wholly uniform way.

The cure which is brought about by commercially reasonable exposure times produces a blanket which has acceptable commercial performance and life.

The photo-curable compositions which later form the surface of the offset blanket consist of a polyene containing at least two unsaturated carbon-carbon bonds per molecule, and a polythiol containing two or more thiol groups per molecule. The term "polyenes" and "polyynes" refer to simple or complex species of alkenes or alkynes having a multiplicity, i.e. at least 2 "reactive" carbon-carbon unsaturated functional groups per average molecule. A diene in the above sense is a polyene that has two "reactive" carbon-carbon double bonds per average molecule, while a diyne is a polyyne that contains in its structure two "reactive" carbon-carbon triple bonds per average molecule. Combinations of "reactive" double bonds and "reactive" triple bonds within the same molecule are also operable. Such, for example, is monovinylacetylene which is a polyene under our definition. The term "reactive" unsaturated carbon-carbon groups means groups which will, under proper conditions, react with thiol groups to yield the thioether linkage

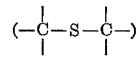

as contrasted to the term "unreactive" carbon-carbon unsaturation which means

groups when found in aromatic nuclei (cyclic structures typified by benzene, pyridine, anthracene, tropolone and the like) which will not react with thiols under the same conditions to give thioether linkages.

A particularly useful polyene operable in the present invention is disclosed in a copending application, Ser. No. 617,801, filed Feb. 23, 1967, and assigned to the assignee of this application. The group therein disclosed includes polyenes having a molecular weight in the range of 300 to 20,000, viscosities ranging from 0 to 20 million centipoises at 70° C., and have the general formula $$\left[A\right]\!\!-\!\!\left(X\right)_m$$

wherein X is a member of the group consisting of

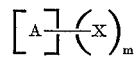

and R—C≡C—; $m$ is at least 2, and R is independently selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon/carbon unsaturation and (2) unsaturated groups in conjugation with the reactive ene or yne groups in X. Thus A may contain cyclic groupings and minor amounts of hetero atoms such as N, S, P or O, but contains primarily carbon-carbon, carbon-oxygen or silicone-oxygen containing chain linkages without any reactive carbon/carbon unsaturation.

Examples of operable polyenes from this group include (1) crotyl-terminated polyurethanes which contain two "reactive" double bonds per average molecule in a near terminal position;

(2) ethylene/propylene/non-conjugated diene terpolymers such as "Nordel 1040" manufactured by Du Pont which contains pendant "reactive double bonds of the formula:

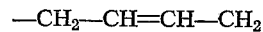

(3) The following structure which contains terminal "reactive" double bonds:

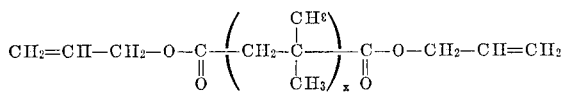

where X is at least 1;

(4) the following structure which contains near terminal "reactive" double bonds:

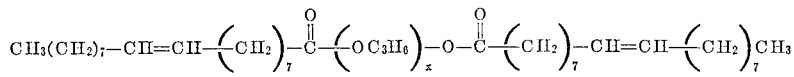

where $x$ is at least 1.

A further group of polyenes which are operable in the present invention includes unsaturated polymers in which the double or triple bonds occur also within the main chain of molecules. These are derived primarily from standard diene monomers such as polyisoprene, butadiene, styrene-butadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation. As examples, adipic acid-butenediol, 1,6-hexanediamine-fumaric acid and 2,4-tolylene diisocyanate-butenediol condensation polymers and the like.

A third group of polyenes operable in this invention includes those polyenes in which the reactive unsaturated carbon to carbon bonds are conjugated with adjacent unsaturated groupings. Examples of operable reactive conjugated ene systems include, but are not limited to, the following:

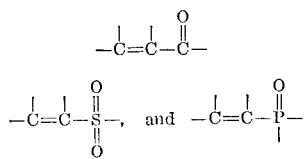

A few typical examples of polymeric polyenes which contain conjugated reactive double bonds groupings such as those described above are polyethyleneether glycol diacrylate having a molecular weight of about 750, polytetramethyleneether glycol dimethacrylate having a molecular weight of about 1175, the triacrylate of the reaction product of trimethylolpropane with 20 moles of ethylene oxide, and the like.

As a general description, the polythiols useful in this invention contain two or more —SH groups/molecule. Their viscosities range from 0 to 20 million centipoises at 70° C. as determined by a Brookfield Viscometer. The molecular weight range lies between 50 and 20,000 and preferably between 100 and 10,000. Then general formula for such composition is

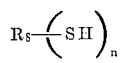

where $n$ is at least 2 and $R_8$ is a polyvalent organic moiety free from reactive carbon/carbon unsaturation. Thus $R_8$ may contain cyclic groupings and minor amounts of hetero atoms such as N, S, P or O, but primarily contains carbon-hydrogen, carbon-oxygen, or silicon-oxygen containing chain linkages free of any reactive carbon/carbon unsaturation.

Certain of the polythiols which fall within this definition have extremely obnoxious odors, nevertheless, they produce offset blankets which are operable. Their use, however, would lead to offensive conditions in the press room. Obviously it is desirable to accomplish this invention with essentially odorless or mildly odorous composition. One class of essentially odorless compositions is composed of the esters of thiol-containing acids of the general formula HS—$R_9$—COOH where $R_9$ is an organic moiety containing no "reactive" carbon/carbon unsaturation with polyhydroxy compounds of the general structure:

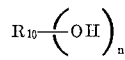

where $R_{10}$ is an organic moiety containing no "reactive" carbon/carbon unsaturation and $n$ is 2 or greater. These components will react under suitable conditions to give a polythiol having the general structure:

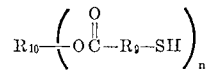

where $R_9$ and $R_{10}$ are organic moieties containing no "reactive" carbon/carbon unsaturation, and $n$ is 2 or greater.

Specific examples of the preferred polythiols include but are not limited to ethylene glycol bis (thioglycolate), ethylene glycol bis ($\beta$-mercaptopropionate), trimethylolpropane tris (thioglycolate), trimethylolpropane tris ($\beta$-mercaptopropionate), penta-erythritol tetrakis (thioglycolate) and pentaerythritol tetrakis ($\beta$-mercaptopropionate), all of which are commercially available.

A preferred polymeric polythiol is polypropylene ether glycol bis ($\beta$-mercaptopropionate), prepared from polypropylene-ether glycol (e.g. Pluracol P2010, Wyandotte Chemical Corp.) and $\beta$-mercaptopropionic acid by esterification. Such combinations possess a low level of mercaptan-like odor initially, but after reaction forms essentially odorless, commercially useful blanket coatings.

"Functionality" refers to the average number of ene or thiol groups per molecule in the polyene or the polythiol. For example, a polymeric dithiol is a polythiol with an average of two thiol groups per molecule: its functionality is two. Few chemical reactions run to 100% of their theoretical value, and as a consequence, functionality is not always a whole number. Assume the reaction ran to but 95% of theory, 10% of the molecules present would have but one functional group. Approximately 90% of the molecules, however, would have the desired structure, and the whole would possess the functionality of 1.9. Such actual (as contrasted with the theoretical) compositions are useful in this invention and will be referred to as possessing their theoretical functionalities.

It is necessary, in order to obtain the maximum strength, maximum solvent resistance, to creep, heat resistance, and freedom from excessive tackiness that the polyenes and the polythiols be formulated in a manner to result, when they are cured, in solid, crosslinked, three-dimensional network polythioether polymer systems.

To achieve this structure, the individual polyenes and polythiols must each have a functionality of at least two. The sum of the functionalities of the polyene and the polythiol components must always exceed four. Blends and mixtures of polyenes and polythiols which possess such functionalities are also operable.

The surface coating composition may include additives such as antioxidants, accelerators of the photo chemical reaction, coloring materials, inhibitors against chemical attack, and, in general, those fillers, pigments, plasticizers, etc., which commonly are used in rubber compounding and plastic technology. The additives are usually added to the polyene or the polythiol in the preblending operation conducted prior to or coincident with the compounding operation. Fillers which may be used include compatible, natural and synthetic resins, carbon black, glass fiber, wood flour, clay, silica, alumina, carbonates, silicates, diatomaceous earth, talc, kaolin, barium and calcium sulphates and the like. These additives may be added in quantities of up to 200 parts per 100 parts of polymer by weight, but it will usually be found advisable to restrict the proportion of filler to that amount which on a volume basis is slightly less than the amount of the solid volume of the polymer.

It is advantageous to incorporate a chemical photoinitiator or sensitizer such as benzophenone, acetophenone, acenaphthenequinone, methyl ethyl ketone, etc., for these, when added to the composition, serve as curing rate accelerators when the coating is exposed to energetic radiation. Other well known photoinitiators or photosensitizers are obvious to one skilled in the art. Rapid, commercially practical cures result. These curing rate accelerators are usually added in amounts ranging from 0.005 to 25% by weight of the photo-curable composition.

It is usually most convenient to compound the ingredients by conventional mixing techniques in normal atmospheres, but the mixture should be shielded from actinic radiation. The mixture can be stored in the dark for substantial periods of time. On exposure to actinic radiation, which however includes sunlight as well as ultraviolet light, it will cure controllably to a solid polythioether product.

Curing inhibitors may be used. They include hydroquinone, p-tertbutyl catechol, 2,6-ditert-butyl-p-methyl-phenol, phenothiazine, and N-phenyl-2-naphthylamine.

The photo-curable composition spread on the blanket carcass is cured throughout its entire thickness by proper exposure to actinic light.

Various light sources may be used such as the conventional carbon arcs used by photo engravers, mercury arcs, fluorescent lamps (provided they are coated with ultraviolet emitting phosphors), xenon arcs, argon glow lamps, and like equipment. Of these various radiation sources, mercury vapor arcs, particularly of the sun-lamp type, and xenon arcs are most suitable. Sunlamp mercury vapor arcs may be placed from 7 to 10 inches above the photo-curable layer. Xenon arcs, depending on the thickness of the coating and the exposure required, may be placed from 24 to 40 inches away.

The supporting base material, i.e. blanket body or carcass, may be the multi-ply fabric which previously has been described, or it may be a highly porous, impregnated fibrous material sold under the name of "Polyfibron" by W. R. Grace & Co. This felted material may itself be reinforced by a fabric lamination.

The exposure time and light intensity which is necessary to effect the hardening of the photo-curable coating composition is dependent upon the thickness of the coating, the curing temperature, the polyene and polythiol employed, the specific photo initiator curing rate accelerator and the presence of light-absorbing pigments or dyes in the photo-curable composition. Obviously the thicker the layer to be cured the longer the exposure time must be. Because the curing rate increases with increasing temperature, sources which emit heat together with the emission of actinic radiant energy are more efficient than cold actinic light sources. The upper limit of temperature is determined by the thermal expansion of the photo-curable composition. A range must be chosen in which the expansion effects are negligible and no rippling or surface distortion occurs. This must, because of the widely differing conditions, be determined by trial and error, usually by the same means as used to determine proper photographic exposure, i.e. stepped exposures in which times and temperatures are the variables.

The blanket may best be coated on a flat bed coating machine equipped with a doctor blade provided with micrometer adjustments so that the thickness of the coating may be very accurately controlled. The coating machines are provided with a rubber deckle to prevent any fall-off in thickness of the coating at the edges of the sheet.

The thickness of the coating may be varied through a fairly wide range. Coatings from 0.006 to 0.200 of an inch and more are useful. Generally, however, coatings in the order of 0.009 to 0.020 of an inch will be used. As a specific example, a coating 0.020 of an inch in thickness will be cured in from 1 minute and 30 seconds to 3 minutes when exposed to the actinic light of a 4,000 watt "Ascorlux" pulsed xenon arc printing lamp placed 30 inches above the surface (available from American Speed Light Corporation).

Substantial cure will occur at the 2 minute value. The blanket is improved in hardness and reduced in tackiness by continuing the exposure for a further period of 2 minutes.

EXAMPLE 1

1 mole of commercially available polyoxyoxypropylene glycol, having a molecular weight of 1958 and an hydroxyl number of 57.6 was charged into a resin kettle equipped with a condenser, stirrer, thermometer, gas inlet and outlet. 4 g. of dibutyl tin dilaurate was added as a catalyst together with 2 moles of tolylene-2,4-diisocyanate and 2 moles of allyl alcohol. The reaction was carred out under nitrogen for 20 minutes at room temperature. Excess alcohol, which existed only as a trace, was stripped from the reaction kettle by holding the kettle under vacuum for a period of 1 hour. The product was a $CH_2=CH$— terminated liquid prepolymer which had a molecular weight of approximately 2400.

EXAMPLE 2

A liquid photo-curable composition was prepared by mixing 0.04 mole of the prepolymer prepared in Example 1, with 0.02 mole of pentaerythritol tetrakis ($\beta$-mercaptopropionate) available from the Carlisle Company under the trade name "Q-43," and 0.008 mole of benzophenone. The mixture was heated to 70° C. to dissolve the benzophenone. The clear, homogenous mixture which resulted had a viscosity in the range of 12,000 to 18,000 cps. The material was coated on a fine-count, laminated offset blanket carcass composed of 3 layers of square weave 80 x 80 prestretched cotton fabric impregnated and adhered together with a butadiene-acrylonitrile combining compound. Lamination of the carcass took place under heat and pressure. The carcass was coated on spreading apparatus equipped with a movable doctor blade which ran over the surface to be coated. The coated material was immobile on the support table. Deckles and the micrometer adjustment of the doctor blade maintained the coating of 0.020 of an inch. After the sheet was coated, the doctor blade was moved out of the way, and the surface was exposed to the light of a 4,000 watt Ascorlux pulsed xenon arc printing lamp made by the American Speed Light Corp. which was placed 30 inches above the surface. Total exposure given to all portions of the coated blanket was 2 minutes and 40 seconds. Thereafter the blanket was removed from the apparatus, punched at either end to receive the blanket hooks and wrapped around the cylinder of a small offset printing press. The lithograph plate test copy was prepared with 11 densities ranging from full black to light gray. Each density was properly reproduced. Performance in all respects equaled a conventionally coated offset blanket.

In addition to spreading the photo-curable composition and doctoring to produce a uniformly thick coat, other well-known coating techniques such as roll coating and coating on a micro-adjustable calendar may be used. In fact, any device which will cover the base or carcass surface with a uniformly thick, smooth coating of photo-curable composition is workable and useful.

The photo-curable compositions used in this invention are described and claimed in the application of Kehr and Wszolek, Ser. No. 617,801, filed Feb. 23, 1967, assigned to the assignee of this application. The entire disclosure of the said Kehr and Wszolek application is herein incorporated by reference.

EXAMPLE 3

The carcass member of the blanket was formed from a "Polyfibron" sheet supplied by the Printing Products Division of W. R. Grace & Co. This sheet was formed from a paper felt containing 100% of mercerized cotton linters having an average density of about 4. The sheet is said to be impregnated with a rubber latex modified with melamine resin and to contain 80% of impregnant calculated on the weight of the dry fiber. The polyfibron base was smooth-calendared and was 0.030 of an inch in thickness. This sheet was placed upon the knife spreading apparatus used in Eample 2, and coated with the composition of Example 1 to produce a coating 0.009 of an inch thick.

The coating knife was then run out of the way, without disturbing the blanket which still remained on the coating support. The coating was exposed to the actinic radiation of an Ascorlux 4000-watt pulsed xenon lamp. Total exposure was 4 minutes. At the end of this time, the coating was thoroughly gelled and tenaciously attached to the Polyfibron blanket base. This blanket was subjected to the same printing test as is described in Example 2. The same varied density negative was used to prepare the lithograph printing plate. When the blanket was run under the same conditions as those of Example 2, there was no discernible difference between the image produced by a blanket of Example 3 and that of Example 2. Both blankets performed equally as well as commercial blankets provided with the usual offset blanket surface.

EXAMPLE 4

To a 2 liter flask equipped with stirrer, thermometer and gas inlet and outlet was charged 450 g. (0.45 mole) of polytetramethylene ether glycol, having a hydroxyl number of 112 and a molecular weight of 1,000, along with 900 g. (0.45 mole) of polytetramethylene ether glycol having a hydroxyl number of 56 and a molecular weight of 2,000, both commercially available from Quaker Oats Co. The flask was heated to 110° C. under vacuum and nitrogen and maintained thereat for 1 hour. The flask, was then cooled to approximately 70° C. whereat 0.1 g. of dibutyl tin dilaurate was added to the flask. A mixture of 78 g. (0.45 mole) of tolylene-2,4-diisocyanate and 78 g. (0.92 mole) of allyl isocyanate was thereafter added to the flask dropwise with continuous stirring. The reaction was maintained at 70° C. for 1 hour after addition of all the reactants. A liquid allyl terminated prepolymer product was formed.

EXAMPLE 5

102.3 parts of the allyl terminated liquid prepolymer of Example 4, 7.7 parts of pentaerythritol tetrakis (β-mercaptopropionate), 1.5 parts benzophenone and 0.1 part of 2,6-ditertiary-butyl-methylphenol were admixed at 70° C. to form a clear homogeneous composition. The procedure of Example 2 was followed to cure the composition on the offset blanket carcass. Using the thus formed blanket, each density of the lithographic plate test copy in Example 2 was properly reproduced and performance in all respects equaled a conventionally coated offset blanket.

The fact that the liquid coating can be applied in very accurately maintained thicknesses and is cured by actinic radiation without measurable loss in the volume of the coating means that the manufacture of the blanket in the manner disclosed not only possesses the considerable economic advantage of avoiding multiple coating operations and drying after each coat, but produces a blanket having very few reject areas, since bubbling and soft spots and improperly released solvents (the cause of difficulties in the older coating methods) cannot occur. The printing surface of these photocured offset print blankets exhibits a durability and wear resistance equal to that of the multicoated blankets of the prior art.

What is claimed is:

1. An offset printing blanket having a blanket body covered by an adherent layer forming the working face of the blanket comprising the insoluble product resulting from the reaction of actinic radiation on a photocurable composition comprising
    (1) a polyene containing at least two unsaturated carbon to carbon bonds per molcule,
    (2) a polythiol containing at least two thiol groups per molecule, the total combined functionality of
        (a) the unsaturated carbon to carbon bonds per molecule in the polyene, and
        (b) the thiol groups per molecule in the polythiol being greater than 4, and
    (3) 0.005 to 25% by weight of said photocurable composition of a photocuring rate accelerator.

2. An offset blanket as claimed in claim 1 wherein the body portion of the blanket comprises a laminar structure formed from a plurality of textile fabric sheets impregnated with a cured elastomeric adhesive substance, and the working face of the blanket is the reaction product of a photocurable composition comprising pentaerythritol tetrakis (β-mercaptopropionate), and a prepolymer formed from polyoxypropylene-glycol, tolylene-2,4-diisocyanate, and allyl alcohol, said reaction product being formed in the presence of actinic light.

3. The offset blanket of claim 2 wherein the photocurable composition includes 0.005 to 25% by weight of said photocurable composition of a curing rate accelerator.

4. An offset blanket as claimed in claim 1 wherein the body portion of the blanket includes a resilient, compressible paper felt impregnated with an elastomeric substance, and the working face of the blanket is the reaction product of a photocurable composition comprising pentaerythritol tetrakis (β-mercaptopropionate) and a prepolymer formed from polyoxypropylene-glycol, tolylene-2,4-diisocyanate, and allyl alcohol, said reaction product being formed in the presence of actinic light.

5. The offset blanket of claim 4 wherein the photocurable composition includes 0.005 to 25% by weight of said photocurable composition of a curing rate accelerator.

6. An offset blanket as claimed in claim 1 wherein the body portion of the blanket comprises a laminar structure formed from a plurality of textile fabric sheets impregnated with a cured elastomeric adhesive substance, and the working face of the blanket is the reaction product of a photocurable composition comprising pentaerythritol tetrakis (β-mercaptopropionate) and an allyl terminated prepolymer formed from polytetramethylene ether glycol, tolylene-2,4-diisocyanate and allyl isocyanate, said reaction product being formed in the presence of actinic light.

7. The offset blanket of claim 6 wherein the photocurable composition includes 0.005 to 25% by weight of said photocurable composition of a curing rate accelerator.

8. An offset blanket as claimed in claim 1 wherein the body portion of the blanket includes a resilient compressible paper felt impregnated with an elastomeric substance, and the working face of the blanket is the reaction product of a photocurable composition comprising pentaerythritol tetrakis (β-mercaptopropionate) and an allyl terminated prepolymer formed from polytetramethylene ether glycol, tolylene-2,4-diisocyanate and allyl isocyanate, said reaction product being formed in the presence of actinic light.

9. The offset blanket of claim 8 wherein the photocurable composition includes 0.005 to 25% by weight of said photocurable composition of a curing rate accelerator.

10. The process of forming an offset printing blanket which includes coating an offset blanket carcass with a photocurable composition comprising
    (1) a polyene containing at least two unsaturated carbon to carbon bonds per molecule, (2) a polythiol containing at least two thiol groups per molecule, the total combined functionality of
  (a) the unsaturated carbon to carbon bonds per molecule in the polyene, and
  (b) the thiol groups per molecule in the polythiol being greater than 4, and
(3) 0.005 to 25% by weight of said photocurable composition of a photocuring rate accelerator, and subsequent to coating, exposing the surface of the coated blanket to actinic radiation for a time sufficient to cause the conversion of the coating into an insoluble product adherent to the carcass.

References Cited

UNITED STATES PATENTS

| | | | |
|---|---|---|---|
| 3,474,077 | 10/1969 | Woodhams | 260—79.5 |
| 3,418,864 | 12/1968 | Ross | 161—401 X |
| 3,338,810 | 8/1967 | Warner | 260—79.5 X |
| 3,264,337 | 8/1966 | Loutham | 260—79.5 X |
| 3,231,382 | 1/1966 | Silver | 161—401 X |
| 3,197,446 | 7/1965 | Ziarnik | 260—79.5 |
| 3,164,643 | 1/1965 | Hubbard | 161—401 X |
| 3,060,853 | 10/1962 | Remer | 161—401 X |

FOREIGN PATENTS 953,786  4/1964  Great Britain.

ROBERT F. BURNETT, Primary Examiner

M. A. LITMAN, Assistant Examiner

U.S. Cl. X.R.

117—93.31; 161—401, 156; 260—79.5